US011605274B2

(12) United States Patent
Howard et al.

(10) Patent No.: US 11,605,274 B2
(45) Date of Patent: Mar. 14, 2023

(54) FALL DETECTION—AUDIO LOOPING

(71) Applicant: Apple Inc., Cupertino, CA (US)

(72) Inventors: Albert Riley Howard, Sunnyvale, CA (US); Catherine B. B. Morrison, San Francisco, CA (US); Christopher P. Saari, San Francisco, CA (US); Heather E. Daniel, Cupertino, CA (US); Kevin M. Lynch, Woodside, CA (US); Ronald Keryuan Huang, San Jose, CA (US); Sherif Mohamed, San Francisco, CA (US); Telford E. Forgety, III, San Jose, CA (US); Matthew W. Crowley, San Francisco, CA (US); Eamon F. Gilravi, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/131,466

(22) Filed: Dec. 22, 2020

(65) Prior Publication Data

US 2021/0110682 A1 Apr. 15, 2021

Related U.S. Application Data

(63) Continuation of application No. 16/529,550, filed on Aug. 1, 2019, now Pat. No. 10,878,683.
(Continued)

(51) Int. Cl.
*G08B 21/04* (2006.01)
*G08B 7/00* (2006.01)
(Continued)

(52) U.S. Cl.
CPC ........... *G08B 7/00* (2013.01); *G06F 3/04842* (2013.01); *G06F 3/165* (2013.01); *G08B 7/06* (2013.01);
(Continued)

(58) Field of Classification Search
CPC ....... G08B 7/06; G08B 21/043; G08B 25/001
See application file for complete search history.

(56) References Cited

U.S. PATENT DOCUMENTS 9,449,495 B1 9/2016 Call et al.
9,717,101 B1 7/2017 Burnham
(Continued)

FOREIGN PATENT DOCUMENTS

CN 101051822 A 10/2007
CN 205680244 U 11/2016
(Continued)

OTHER PUBLICATIONS

"Notice of Acceptance for Patent Application," dated Jun. 15, 2021 in Australian Patent Application No. 2019369240. 3 pages.
(Continued)

*Primary Examiner* — Andrew W Bee
(74) *Attorney, Agent, or Firm* — Kilpatrick Townsend & Stockton

(57) ABSTRACT

Techniques are provided for contacting emergency response services when certain conditions are met. In some instances, it may be determined, by a wearable device, whether a user has responded to a first user interface prompt displayed in response to detection of a physical event associated with the user. In accordance with a determination that the user has not responded to the first user interface prompt after expiration of a first time period, certain actions may be performed. For example, a countdown timer may begin to run for a second timer period. During the second period, an audio alert and a haptic alert may be output by the wearable device. In accordance with a determination that the user has not responded to a second user interface prompt prior to expi-
(Continued)

ration of the second time period, a communication channel request may be transmitted to an emergency response service by the wearable device.

17 Claims, 9 Drawing Sheets

Related U.S. Application Data

(60) Provisional application No. 62/809,303, filed on Feb. 22, 2019, provisional application No. 62/754,406, filed on Nov. 1, 2018.

(51) Int. Cl.
*G06F 3/04842* (2022.01)
*G06F 3/16* (2006.01)
*G08B 7/06* (2006.01)
*G08B 25/00* (2006.01)

(52) U.S. Cl.
CPC ......... *G08B 21/043* (2013.01); *G08B 25/001* (2013.01)

(56) References Cited

U.S. PATENT DOCUMENTS

| | | | |
|---|---|---|---|
| 2009/0040052 A1* | 2/2009 | Cameron | G08B 25/016 340/573.1 |
| 2009/0174565 A1* | 7/2009 | Chan | G08B 25/016 340/669 |
| 2011/0201301 A1 | 8/2011 | Okada et al. | |
| 2012/0237002 A1* | 9/2012 | Sennett | H04W 4/02 379/45 |
| 2013/0090083 A1* | 4/2013 | DeMont | A61B 5/746 340/539.13 |
| 2013/0214925 A1* | 8/2013 | Weiss | G08B 25/016 340/539.11 |
| 2013/0307685 A1* | 11/2013 | Sholder | G08B 25/016 340/539.12 |
| 2014/0106782 A1 | 4/2014 | Chitre et al. | |
| 2015/0145662 A1 | 5/2015 | Barfield, Jr et al. | |
| 2015/0269824 A1 | 9/2015 | Zhang | |
| 2015/0269827 A1 | 9/2015 | Hopkins et al. | |
| 2016/0078739 A1 | 3/2016 | Burton et al. | |
| 2016/0078747 A1* | 3/2016 | King | G16Z 99/00 340/539.12 |
| 2016/0345150 A1* | 11/2016 | Shim | H04W 76/50 |
| 2018/0000385 A1* | 1/2018 | Heaton | G08B 25/016 |
| 2018/0357887 A1* | 12/2018 | Geyer | G08B 21/0446 |
| 2019/0069154 A1* | 2/2019 | Booth | G06F 1/3231 |
| 2019/0343465 A1* | 11/2019 | Sipolins | A61B 5/318 |

FOREIGN PATENT DOCUMENTS

| | | |
|---|---|---|
| CN | 106293605 A | 1/2017 |
| JP | H10107923 A | 4/1998 |
| JP | 2000251177 A1 | 9/2000 |
| JP | 2006067030 A | 3/2006 |
| JP | 2006277464 A | 10/2006 |
| JP | 2016177356 A | 10/2016 |
| JP | 2016177449 A | 10/2016 |
| JP | 2017200159 A | 11/2017 |
| JP | 2018032436 A | 3/2018 |
| KR | 20040041729 A | 5/2004 |
| KR | 20100137063 A | 12/2010 |
| KR | 20170095041 A | 8/2017 |
| WO | 2007102414 A1 | 9/2007 |

OTHER PUBLICATIONS

"Notification of the First Office Action," dated Aug. 4, 2021 in Chinese Patent Application No. 2019800722920. 19 pages (includes English translation).
"Notification of the First Office Action," dated Nov. 26, 2021 in Japanese Patent Application No. 2021-522483. 8 pages (includes English translation).
"Notification of Preliminary Rejection," dated Dec. 9, 2021 in Korean Patent Application No. 10-2021-7024533. 13 pages (includes English translation).
"International Search Report and Written Opinion," dated Jan. 27, 2020 in International Application No. PCT/US2019/058401. 11 pages.
"Non-Final Office Action," dated Apr. 27, 2020 in U.S. Appl. No. 16/529,550. 13 pages.
"Notice of Allowance," dated Aug. 27, 2020 in U.S. Appl. No. 16/529,550. 9 pages.
"Notice of Allowance," dated May 21, 2020 in Korean Application No. 10-2021-7013166. 7 pages, includes English translation of allowed claims.
Application No. CN201980072292.0, Office Action, dated Jan. 19, 2022, 3 pages.
Application No. EP19805056.9, Office Action, dated Feb. 22, 2022, 5 pages.
AU2021209354, "First Examination Report", dated Jun. 21, 2022, 3 pages.
Application No. JP2021-522483, Notice of Allowance, dated Apr. 18, 2022, 8 pages; Google Translation on Apr. 26, 2022 begins on p. 5.
Application No. CN201980072292.0, Notice of Decision to Grant, dated Apr. 11, 2022, 4 pages, Google Translation completed on Apr. 19, 2022 begins on p. 3.
Application No. KR10-2021-7024533, Notice of Decision to Grant, dated Jun. 15, 2022, 10 pages. English translation begins on p. 9.
"Notice of Intention to Grant," dated Sep. 29, 2022 in EPO application No. 19 805 056.9-1218. 7 pages.

\* cited by examiner

FALL DETECTION—AUDIO LOOPING

CROSS-REFERENCES TO RELATED APPLICATIONS

This application is a continuation of U.S. patent application Ser. No. 16/529,550 (now U.S. Pat. No. 10,878,683), filed Aug. 1, 2019, entitled "Fall Detection—Audio Looping" which claims the benefit of U.S. Provisional Application No. 62/754,406, filed Nov. 1, 2018, entitled "Fall Detection—Audio Looping," and U.S. Provisional Application No. 62/809,303, filed Feb. 22, 2019, also entitled "Fall Detection—Audio Looping." The disclosures of these applications are incorporated by reference herein in their entirety.

BACKGROUND

Mobile devices and their applications have become so ubiquitous and useful, that people tend to utilize them throughout the day. Additionally, some mobile devices are so useful that they are worn throughout the day. Such wearable devices can track a user's physical activity and biometric statistics. They may also be configured to connect to one or more networks, such as the Internet or a cellular service provider. However, if a user, wearing a wearable device, is involved in an accident or emergency, they may not be able to access the device to call for help. While the device may be able to detect that the user is incapacitated, and may be capable of calling for help, the user may not be able to activate any emergency protocols or even communicate with emergency services.

BRIEF DESCRIPTION OF THE DRAWINGS

Various embodiments in accordance with the present disclosure will be described with reference to the following drawings.

DETAILED DESCRIPTION

Figure 1:
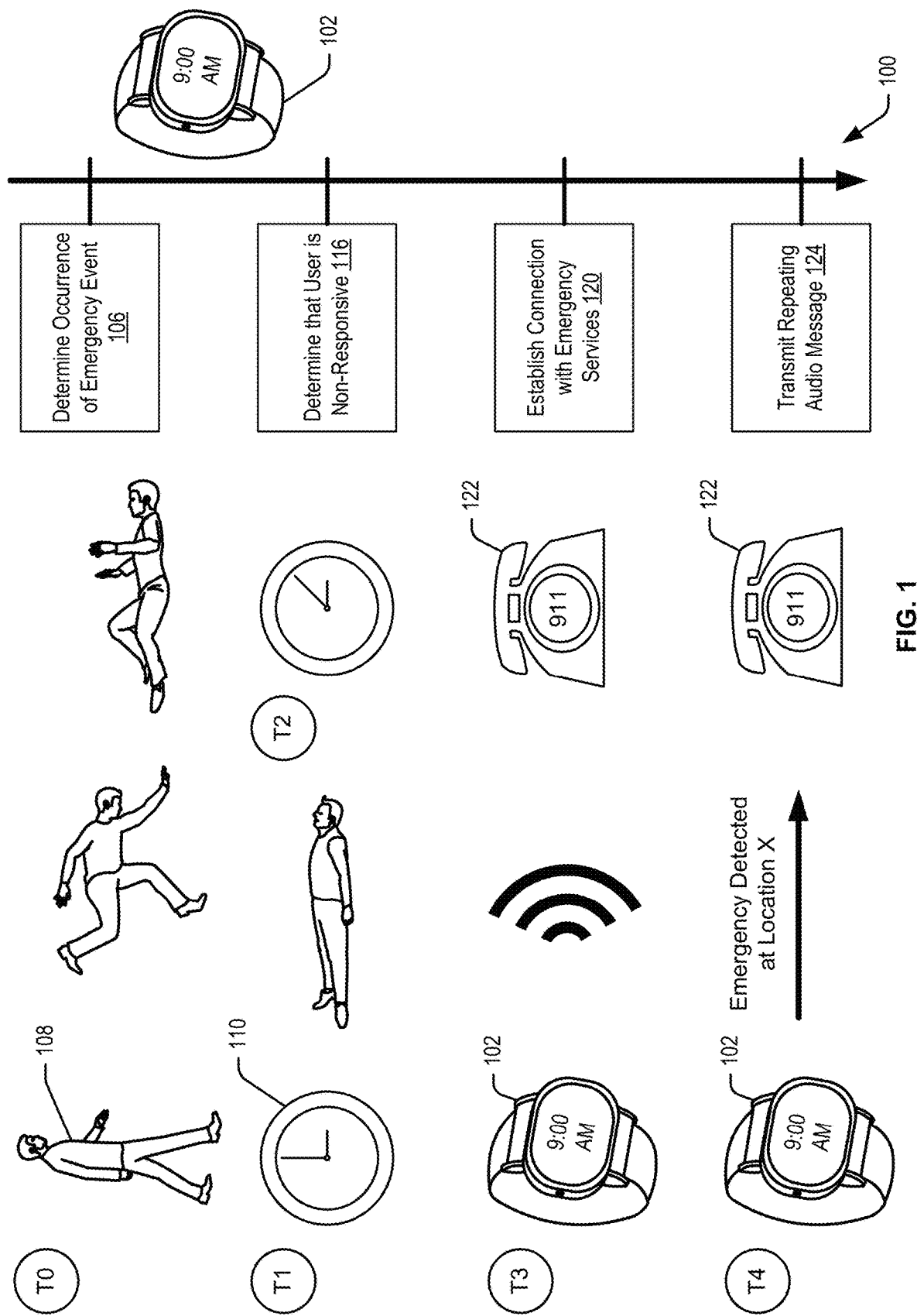
FIG. 1 is a simplified block diagram illustrating an example flow for providing audio looping techniques as described herein, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In some examples, the details described herein provide techniques for audio looping information about a user to a service provider. In some examples, the user may have been involved in an accident (e.g., a fall, a medical incident (e.g., a heart attack or stroke), a car accident, or the like), and the information that is provided via the audio loop may identify the accident and/or a location of the accident. In some instances, the service provider may be an emergency service (e.g., a 911 operator or other appropriate service provider based at least in part on the location of the user). The device may be a wearable device, such as a watch, which is capable of detecting when a user (e.g., the wearer) has fallen (or been involved in another type of accident) and has not responded within a period of time after the fall. The device may establish a connection with the service provider, and provide the information. The information may be provided as an audio message, that can be looped repeatedly for a particular amount of time, or at least until the user has responded, the service has terminated the communication connection, or some other event occurs which signifies that the emergency is over.

In some examples, the device may be configured with one or more template messages in text form (e.g., one or more text strings). The template messages may be configured with blank spots (e.g., configurable portions) that can be supplemented with relevant content collected by sensors of the device. One example of a template message is "The owner of this _____ has been involved in a(n) _____ and is not responding. The location of the _____ is _____ and _____ with an estimated radius of _____." In this example, each of the blank spaces corresponds to a configurable portion (e.g., portions A, B, C, D, E, and F). By way of example, A might be configured receive "device type" information (e.g., watch, tablet, etc.), B might be configured to receive "event type" information (e.g., fall, heart attack, car accident, emergency, etc.), C might be configured to receive the "device type" or "event type" information, D and E might be configured to receive "location" information (e.g., latitude and longitude, nearest cross streets, etc.), and F might be configured to receive "estimated degree of error" information (e.g., 5 meters, 10 meters, 25 meters, one block, etc.). In some examples, various sensors of the device may be able to detect (or retrieve from memory) the information needed for A-F above. As such, once the data is collected, the example message from above might become "The owner of this watch has been involved in a fall and is not responding. The location of the watch is latitude 37.1234 and longitude −121.1234 with an estimated radius of 25 meters," (the underlined text in this example is to signify what text was added to the configurable portions). In some cases, the message may also repeat the location immediately after sending the message. The message may be played on a loop until an event occurs that triggers the end of the loop. Additionally, the text string may be transmitted as text, or converted to audio using a text-to-speech process. In the latter example, the audio file may be transmitted to the service provider (e.g., to the 911 operator). Further, in some examples, the audio message can be played (and looped) by a speaker of the device. In this way, the user that has been involved in the accident and/or anyone nearby (e.g., emergency responders, a doctor, etc.) can hear the message and potentially respond or stop the loop.

FIG. 1 illustrates an example flow 100 for a process implemented by a device 102. While the device 102 is illustrated in FIG. 1 as a watch, any type of electronic device with network connectivity could be configured to implement flow 100. As noted above, any type of event could be detected by the device 102, and any type of connection could be implemented to provide information about the event. However, in flow 100 of FIG. 1, the event illustrated is that of a user falling over and becoming unresponsive. At block 106, the device 102 may determine the occurrence of an emergency event. As noted, and signified by time T0 of FIG. 1, the emergency event in this example, corresponds to a user 108 falling over. In some examples, the device 102 may present a UI element as soon as the fall is detected. This UI element may provide options for the user to indicate that they are "ok," or that they want to call an emergency service (e.g., "911" in the United States). Various different UI elements (e.g., virtual buttons) may be presented. For example, "I'm ok," "I fell, but I'm ok," or "I did not fall." In one example, if the user selects the initial "I'm ok" UI element, then one or more follow-up questions may appear, where the user can select either "I fell, but I'm ok" (indicating that the fall detection was correct, but that there is no emergency) or "I did not fall" (indicating that the fall detection algorithm was not accurate). In either case, the results can be fed back into the fall detection algorithm (e.g., to help improve the accuracy of the fall detection). If either of these options are selected, the device 102 can end flow 100, and not proceed to attempt to establish a call with an emergency response service. Additionally, if the user selects "I'm ok," then a timer that attempts to detect how long the user is nonresponsive is paused.

However, if the user doesn't select "I'm ok," then the timer (e.g., using clock/timer 110) may be started at time T1 of FIG. 1, which may correspond to a time after the device 102 has determined the occurrence of the emergency event at block 106. At time T2 of FIG. 1, the user may still be laying down (e.g., still nonresponsive). If an amount of time has passed between time T1 and time T2, the device 102 may determine that the user is nonresponsive at block 116. If the user is still nonresponsive, at time T3, the device 102 may establish a connection with emergency services at block 120. In this case, the device 102 may place a cellular (or other type of) call to a telephone 122 associated with the emergency services (e.g., by calling "911"). In other examples, instead of dialing "911," the device may look up the appropriate emergency services number for the location of the user. For example, in Spain, emergency services are accessed by dialing "112." Thus, if the user were in Spain when the emergency event occurred, the device 102 would dial "112" at block 120. Additionally, the device 102 may also identify an appropriate language for a text to audio conversion, and may transmit the audio in the appropriate language for the location of the user. For example, in Spain, the audio would be generated in Spanish. In countries where there are multiple languages, the device 102 may refer to a priority list of languages and generate the audio according to the list (e.g., if the device is capable of creating the audio in the first language on the list, that would be performed; however, if not, the device 102 would use the second language on the list, and so on). At block 124, which corresponds to time T4 of FIG. 1, the flow 100 may end when the device 102 transmits a repeating audio message to the device 122 of the emergency services. For example, the device 102 may transmit an audio message that states, "Emergency detected at Location X" where X is the relative address of the user 108. However, as noted above, the audio message could contain more information, including, but not limited to, latitude and longitude, the name of the user, medical conditions of the user, the type of emergency or event, an error range for location, the type of the device being utilized by the user, or the like.

Figure 2:
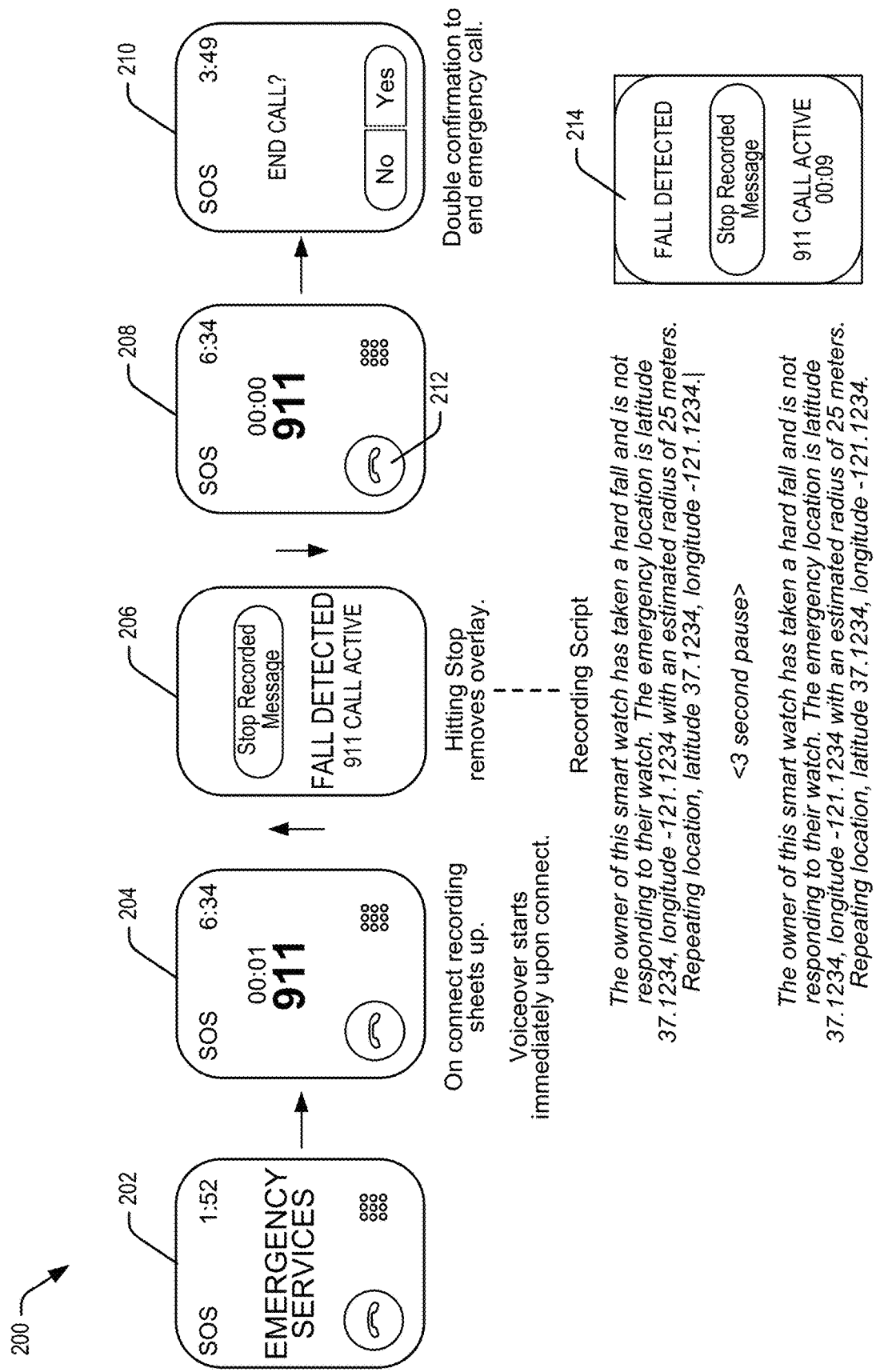
FIG. 2 is another simplified block diagram illustrating another example flow for providing audio looping techniques as described herein, according to at least one example.

FIG. 2 illustrates another flow 200 for implementing the techniques described herein. In flow 200, a device (e.g., similar to device 102 of FIG. 1) may have determined that a call to emergency services is appropriate (e.g., the user is not responding after detection of a potential emergency event). In this flow, at block 202, the device 102 may attempt to establish a connection with emergency services. Attempting to establish a connection may include dialing the number (e.g., in this case, "911") and/or pausing while the phone rings. . Once the phone is answered, the connection is established. At block 204, the emergency service has answered the call. In this instance, the audio recording (e.g., the audio file that was generated based at least in part on the text string) can begin playing. In some instances, the audio recording may begin immediately upon connection. However, in other instances, the device 102 may wait a few seconds and/or until an operator, automated service, or like responds to the connection being made (e.g., the device 102 may wait until a person or computing device says something, e.g., "911 what is your emergency" or the like). As noted, one example, of the audio includes "The owner of this smart watch has taken a hard fall and is not responding to their watch. The emergency location is latitude 37.1234, longitude −121.1234 with an estimated radius of 25 meters. Repeating location, latitude 37.1234, longitude −121.1234." In some cases, the audio may loop (e.g., repeat) every 3 seconds, 5 seconds, or the like, as desired, until some event ends the audio loop.

In some cases, once the attempted call connect is established, and the audio looping begins, an overlay may be displayed on the UI of the device 102. For example, the UI of blocks 202 and 204 may be replaced with the overlay displayed in block 206. That is, the overlay may include separate options that can enable the user to exit the audio looping. In this example, the overlay displays a virtual button that states "Stop Recorded Message" and also includes some text stating the emergency event and the connection that was activated (e.g., in this case, it states "Fall Detected" and "911 Call Active"). In some examples, one way to end the audio loop is to interact with overlay. For example, at block 206, a user may select the "Stop Recorded Message" UI element. If this virtual button is selected (e.g., via touch activation on a touch screen), the overlay may be removed. In some examples, the original UI may be presented at block 208, which has the same UI elements as before the overlay, and/or a double confirmation UI may be presented at block 210, which asks the user if they want to end the call and provides two UI options (e.g., "no" to not end the call or "yes" to end the call).

Alternatively, in some examples, the UI of block 202 is displayed while attempting to establish the connection, the UI of block 204 is displayed once the connection is made, the overlay UI of block 206 is displayed while the audio looping is being performed, the overlay UI of block 206 is removed upon selection of the "Stop Recorded Message" UI element, the UI of block 208 (which is the same as the UI of block 204) is displayed after the looping ends, and the UI of block 210 is only displayed after the user selects the "hang-up" UI element 212. In this example, the "yes" or "no" options are a double confirmation for ending the call because the user already selected the "hang-up" UI element 212, but has to still select "yes" to end the call. In this way, a user cannot accidentally end the call with the emergency service. In some cases, block 214 is an alternate option for block 206, where the layout of the text is different and the call time is shown.

In some examples, the audio messages can be configured to continue looping as long as the call with the emergency is active or until the user selects the "Stop Recorded Message" UI element. If the emergency service responder hangs up, the call will end. In some instances, the workflow may begin to reestablish the call (or make another call) if the user remains nonresponsive. Alternatively, if the call ends, and the emergency service responder calls back, the device 102 may answer the call and begin playing the already generated audio message. This audio message could also be looped until the user selects the "Stop Recorded Message" UI element. Further, in some cases, the device 102 may detect an indication of failure of the process (e.g., the call was terminated early, the emergency service responder didn't understand, the user is still nonresponsive, etc.), in which case, the process may start over with the initial audio/haptic feedback, announcing to the user that a call to an emergency service is about to be placed if the user does not respond. Additionally, in some examples, the audio message may initially be played at full volume (e.g., the first loop), and then played at a reduced volume for subsequent loops. For example, the speaker of device 102 may play the audio message at full volume for the first loop and then at a reduced volume thereafter. Similarly, the audio message that is sent to the emergency service responder may be played at full volume for the first loop and then at a reduced volume for subsequent loops. In this way, a user of the device 102 (or a bystander, emergency service technician, or the like) and/or the emergency service responder (or operator) can still effectively communicate over the open telephone line without the volume of the audio message being too loud. The reduced volume on subsequent loops can also enable the responder or operator to hear what may be happening in the background at the site of the incident.

Figure 3:
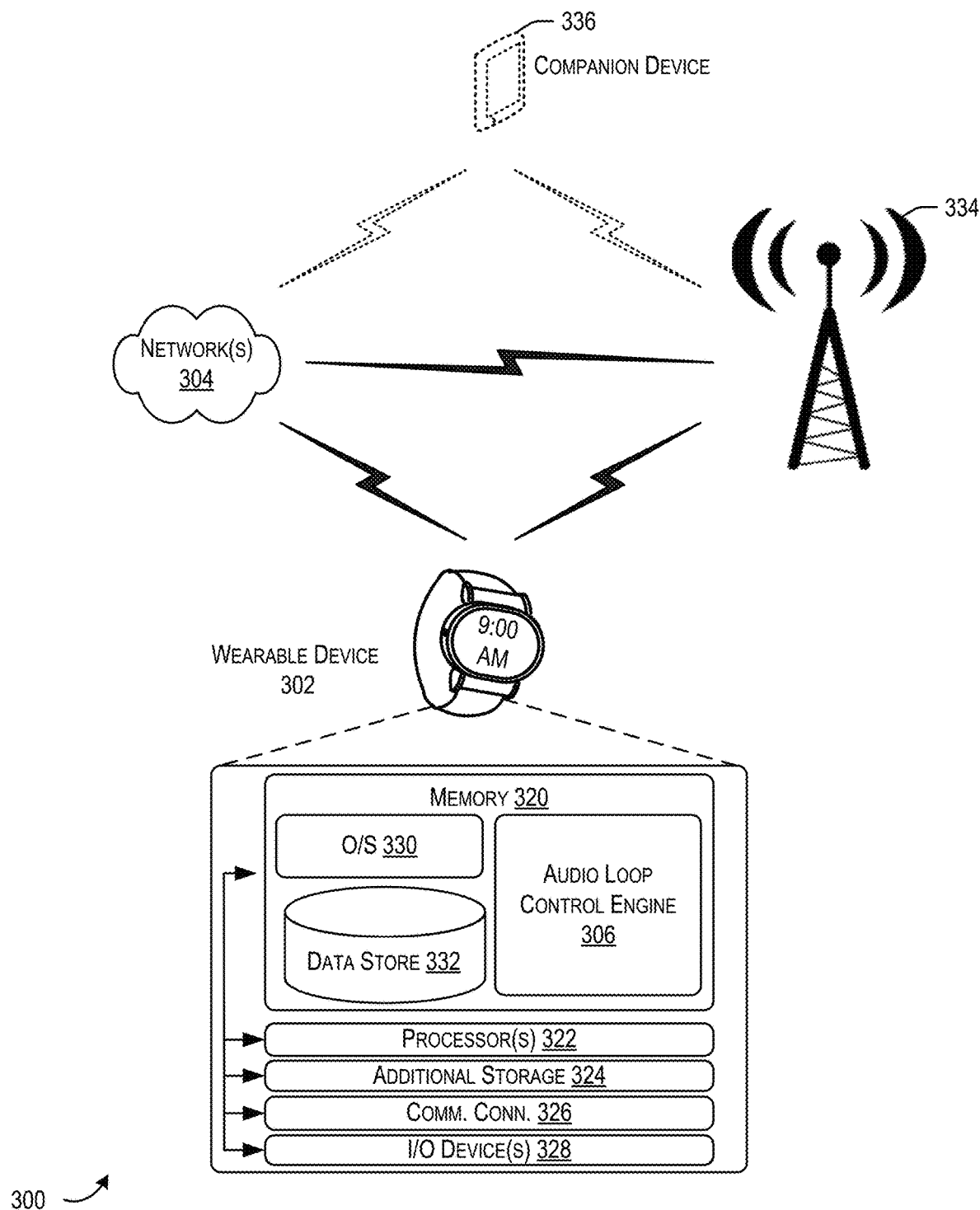
FIG. 3 is another simplified block diagram illustrating an example architecture for providing audio looping techniques as described herein, according to at least one example.

FIG. 3 illustrates components of an audio looping system 300 according to at least some embodiments. System 300 may include user device 302 that may communicate with other devices over networks 304 utilizing any suitable communications protocol. The user device 302 can be any type of computing device accessible to a user, including a smart watch, a personal computer, a smart phone, a tablet, or the like.

In some examples, the networks 304 may include any one or a combination of many different types of networks, such as a cellular network, cable networks, the Internet, wireless networks, or other private and/or public networks. As noted above, the user device 302 may be configured to execute or otherwise manage applications or instructions for presenting an audio loop to a service provider (e.g., utilizing the audio loop control engine 306).

In one illustrative configuration, the user device 302 may include at least one memory 320 and one or more processing units (or processor(s)) 322. The processor(s) 322 may be implemented as appropriate in hardware, computer-executable instructions, or combinations thereof. Computer-executable instruction or firmware implementations of the processor(s) 322 may include computer-executable or machine-executable instructions written in any suitable programming language to perform the various functions described.

The memory 320 may store program instructions that are loadable and executable on the processor(s) 322, as well as data generated during the execution of these programs. Depending on the configuration and type of the user device 302, the memory 320 may be volatile (such as random access memory (RAM)) and/or non-volatile (such as read-only memory (ROM), flash memory, etc.). The user device 302 may also include additional removable storage and/or non-removable storage 324 including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 320 may include multiple different types of memory, such as static random access memory (SRAM), dynamic random access memory (DRAM), or ROM. While the volatile memory described herein may be referred to as RAM, any volatile memory that would not maintain data stored therein once unplugged from a host and/or power would be appropriate.

The memory 320 and the additional storage 324, both removable and non-removable, are all examples of non-transitory computer-readable storage media. For example, non-transitory computer readable storage media may include volatile or non-volatile, removable or non-removable media implemented in any method or technology for storage of information such as computer-readable instructions, data structures, program modules, or other data. The memory 320 and the additional storage 324 are both examples of non-transitory computer storage media. Additional types of computer storage media that may be present in the user device 302 may include, but are not limited to, phase-change RAM (PRAM), SRAM, DRAM, RAM, ROM, electrically erasable programmable read-only memory (EEPROM), flash memory or other memory technology, compact disc read-only memory (CD-ROM), digital video disc (DVD) or other optical storage, magnetic cassettes, magnetic tape, magnetic disk storage or other magnetic storage devices, or any other medium that can be used to store the desired information and that can be accessed by the user device 302. Combinations of any of the above should also be included within the scope of non-transitory computer-readable storage media.

Alternatively, computer-readable communication media may include computer-readable instructions, program modules, or other data transmitted within a data signal, such as a carrier wave, or other transmission. However, as used herein, computer-readable storage media does not include computer-readable communication media.

The user device 302 may also contain communications connection(s) 326 that allow the user device 302 to communicate with a data store, another computing device or server, user terminals and/or other devices via one or more networks. Such networks may include any one or a combination of many different types of networks, such as cable networks, the Internet, wireless networks, cellular networks, satellite networks, other private and/or public networks, or any combination thereof. The user device 302 may also include I/O Device(s) 328, such as a touch input device, an image capture device, a keyboard, a mouse, a pen, a voice input device, a display, a speaker, a printer, etc.

Turning to the contents of the memory 320 in more detail, the memory 320 may include an operating system 330 and/or one or more application programs or services for implementing the features disclosed herein. The memory 320 may include data store 332 which may be configured to store image data and/or one or more models corresponding to one or more near viewing control elements. The memory 320 may also include the audio loop control engine 306.

In some examples, the audio loop control engine 306 can be configured to implement the features described above (e.g., implementing the text string generation, audio recording generation (e.g., based at least in part on the text string and sensor-detected data, and the audio looping).

In some instances, the device 302 may be able to connect directly to a cellular tower 334. However, in some other instances, the device 302 may optionally communicate with a companion device 336. While FIG. 3 illustrates the user device 302 optionally communicating with the companion device 336 via the networks 304, the device 302 may instead communicate directly with the companion device 336. Further, in some examples, when connection with the companion device 336 is desired or required (e.g., if the device 302 doesn't have a cellular radio to connect to the cellular tower 334), the companion device 336 may connect to the cellular tower 334 on behalf of the device 302, and may act as a proxy for the cellular connection.

Returning to the audio loop control engine 306, this engine 306 may be responsible for various steps (e.g., all or at least a subset of the steps described herein) of the implementation of the audio looping. In one example, the audio loop control engine 306 may be able to detect when a user falls or otherwise is involved in an accident event. If the audio loop control engine 306 detects such an event, it may begin a timer. If some time passes (e.g., 30 seconds, 60 seconds, or the like) without activity from the user, the audio loop control engine 306 may instruct the device 302 to begin alerting the user that it may attempt to establish an emergency call. In some instances, the audio loop control engine 306 may instruct the speakers and/or haptic generation equipment of the device 302 to provide audio and/or haptic alerts to the user. The audio and/or haptic alerts may ramp up from a low level of alert to a more intense level of alert, at least until the user responds to the alert or the timer expires. In the former case, the audio loop control engine 306 may terminate the workflow. However, in the latter case, the audio loop control engine 306 may be attempt to establish a connection with an emergency service.

In some examples, the audio loop control engine 306 may be responsible for determining the appropriate emergency service to call (e.g., 911 in the United States, 112 in Spain, etc.) and/or the appropriate language to use. Once an appropriate language is determined, the audio loop control engine 306 may convert the text string into an audio file in the determined language. In some cases, the appropriate number to call and the appropriate language to use may be received from the cellular carrier to which the device 103 is connected. However, in other examples, the carrier may only provide the emergency service number and the country in which the device 302 is located. In this case, the audio loop control engine 306 may make an application programming interface (API) call, using the identified country, in order to retrieve a list of most popular languages for that country. If the audio loop control engine 306 can convert into the most popular language, the text will be converted to audio in that most popular language. Otherwise, it will go to the next one, and so on, until a language is selected and the audio is generated. In some examples, a default or fallback (e.g., when no appropriate language can be determined) option may be to use English, even when the device 302 is not located in the United States. In some examples, the most popular language (e.g., Hindi in India) may not be the most appropriate language for making an emergency call. In this case, the audio loop control engine 306 may default to English. The appropriate language and/or lists of most popular languages for each country may be stored, locally, in the data store 332. Additionally, while the language of the audio message may be specific to the country in which the user is located, the language of text on the UI of the device 302 would remain in the language set by the user (e.g., in English for an English speaker). Thus, there may be instances where the audio message is in one language while the UI text is in another.

In some examples, the audio loop control engine 306 may be configured to determine additional information (e.g., user information) to be included in the text string. For example, it may be relevant to the emergency service (e.g., based at least in part on the particular event that occurred) to be informed about health information of the user (e.g., heart health information, blood pressure, pulse, etc.). In some cases, this health information may also be stored in the data store 332. As such, the text string may include the user's health information, and that health information may be converted to audio and then injected into the call. Additionally, user options (e.g., where the emergency service attendant may be the user) may be provided that could enable the user to request additional information. For example, the text string (and, thus, the audio message) could be generated to state "Press '1' for health information or Press '2' for repeating the location information." In this case, the response from the user could be detected via tone, and an appropriate response could be injected into the loop (e.g., adding the health information).

In some examples, the audio loop control engine 306 may be configured to enable the user of the device 302 to configure the text string (and, thus, the audio message). For example, the user may be able to configure the text string to provide options to the emergency service call recipient. As described above, the message could state whatever the user configured the text string to include. One non-limiting example would be for the text string to state "Press '1' to getting the location of the user, Press '2' for repeating the message, Press '3' for health information." However, other options are possible based on what the user wants the message to state. In response to this message, the emergency service responder (e.g., call recipient) could select a number on their telephone corresponding to the options provided, and the audio loop control engine 306 could respond with the appropriate information. In some cases, when the responder selects a button on their phone, the audio loop control engine 306 could interpret the frequency (tone) of the button they selected to determine which button was selected, and generate a new text string (if necessary) to inject the appropriate audio response (once the string is converted to audio). Dual-tone multi frequency (DTMF) technology can be utilized in order to interpret the responders response. One option would be to enable the responder to go back to a main menu of options. Another option would be to return to the main audio loop once the responders request is answered. Another option would be for the initial audio loop to identify that there was an emergency event and provide the main menu, giving the responder full control of what information is provided.

In another example, the audio loop control engine 306 may be able to detect when there is audio coming from the responder, and only then inject the audio message and/or audio looping message. In this way, the audio message provided by the audio loop control engine 306 may not start until the responder actually answers the call, as opposed to beginning the audio message immediately after the call is answered. In this way, the responder would always hear the beginning of the audio message and would understand the entire message. Otherwise, it is possible that the responder would be confused by the message if they don't hear the beginning. Another benefit to controlling the playback in this way is to avoid the scenario where the emergency service does not have a responder answering the calls, and the call needs to be routed to an appropriate department. In some cases, it may be possible to detect that the call has been put on hold, or was being transferred to a different responder. In this case, the audio loop control engine 306 may be configured to wait until there is a human on the call, or until the call is no longer on hold or has been transferred.

In another example, the audio loop control engine 306 may be configured to detect audio at a microphone of the device 302. In some instances, if audio is detected, the audio loop control engine 306 may pause the injection of the audio message so that the user or an emergency medical technician can talk directly to the responder via the call connection. In this way, the audio loop control engine 306 would be configured to turn the call connection into a regular call and allow a person near the device 302 to talk to the responder directly. Thus, the workflow of the audio loop control engine 306 could be terminated in this case. However, in some cases, the audio loop control engine 306 may detect audio, but may be able to determine that the audio is background noise (e.g., traffic, television, crowd noise, etc.) and/or not understandable (e.g., the user is not making sense because they are delirious from the fall), in which case the workflow may continue (e.g., continuing to inject the audio loop and/or perform other techniques described herein). In some instances, some level of confidence may be determined that the audio being detected at the device 302 is coming from the user. In this example, only when the confidence level is above a threshold would the audio loop control engine 306 terminate the workflow (e.g., the looping audio). In all of these examples, the call would not necessarily be terminated, just the audio message and/or audio looping.

Additionally, in some examples the audio loop control engine 306 may be configured to generate the audio message, embed it into a text message, and provide a text to an emergency service that include the audio file. In this way, the emergency service can still receive the information even if the device 302 loses cellular connectivity during the call. Additionally, in instances where the device 302 cannot place cellular calls directly, and needs to use the optional companion device 336, the audio looping, audio injection, and UI elements would still be performed by the device 302. In this way, the companion device 336 may act merely as a host for the call (e.g., as a tunnel for the connection). Thus, even when the companion device 336 is needed to host the cellular call or other connection to the emergency service, the techniques described herein would still operate the same.

While all of the above techniques have been described as being performed by the audio loop control engine 306, it is to be understood that any number of various modules, engines, and/or applications of the device 302 may be utilized to perform the above techniques. For example, fall detection, audio detection, text string generation, audio message generation, location determination, etc., may each or all be performed by different modules or engines, and the techniques described should not be limited to all being performed by a single module or engine (e.g., the audio loop control engine 306).

In some examples, any physical motion of the user that matches or substantially matches a signature associated with a fall of the user, can be used to determine that the user has fallen. For example, if the user is involved in a car accident, the device may generate a motion signature. If this motion signature matches or substantially matches a fall signature, the workflow described herein may be implemented even though the user didn't actually fall over from a standing position. In this way, an emergency call may be made in various emergency situations, even when the user may not have physically fallen over.

Figure 4:
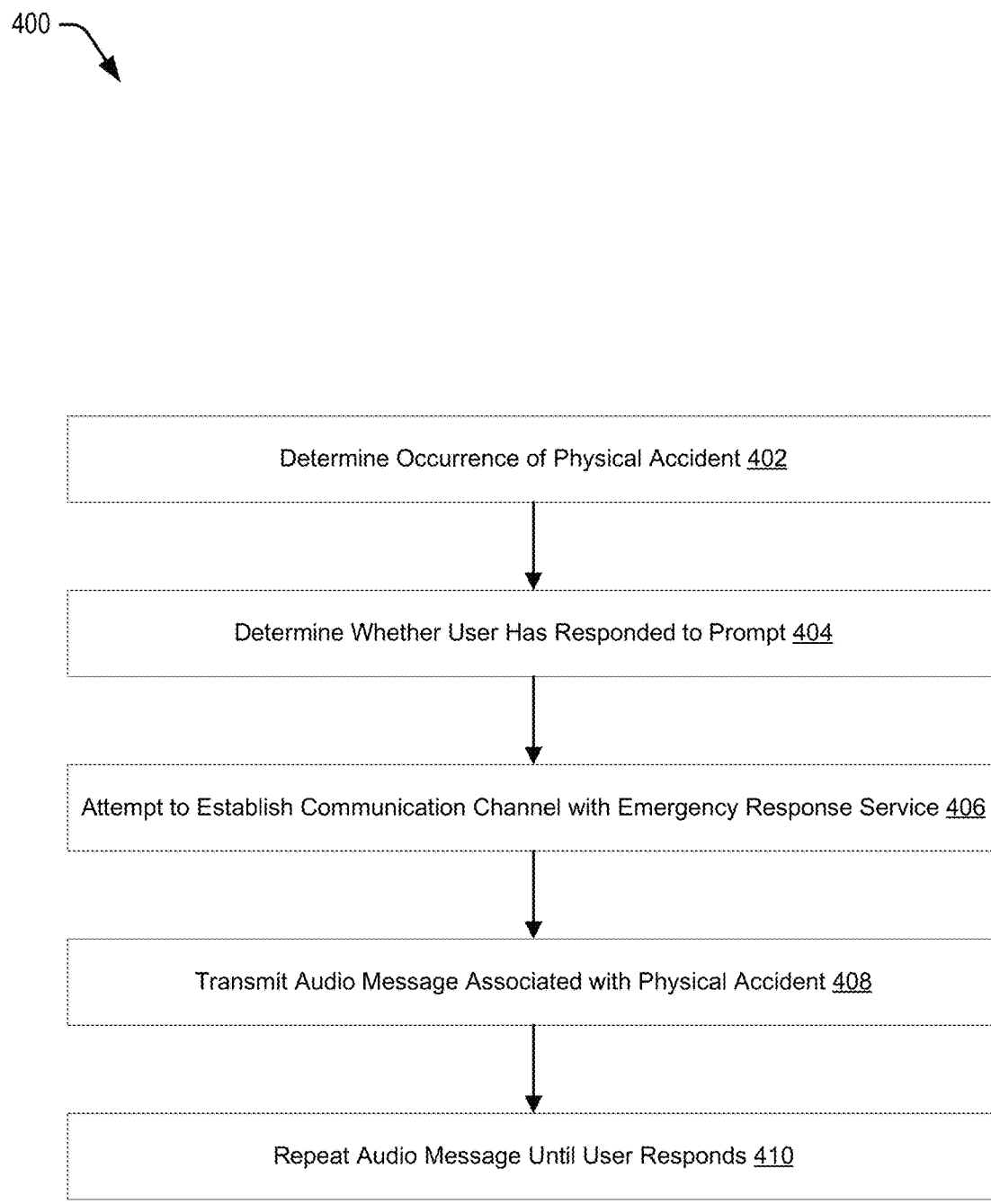
FIG. 4 is a simplified flowchart of an example method for providing audio looping techniques as described herein, according to at least one example.
Figure 5:
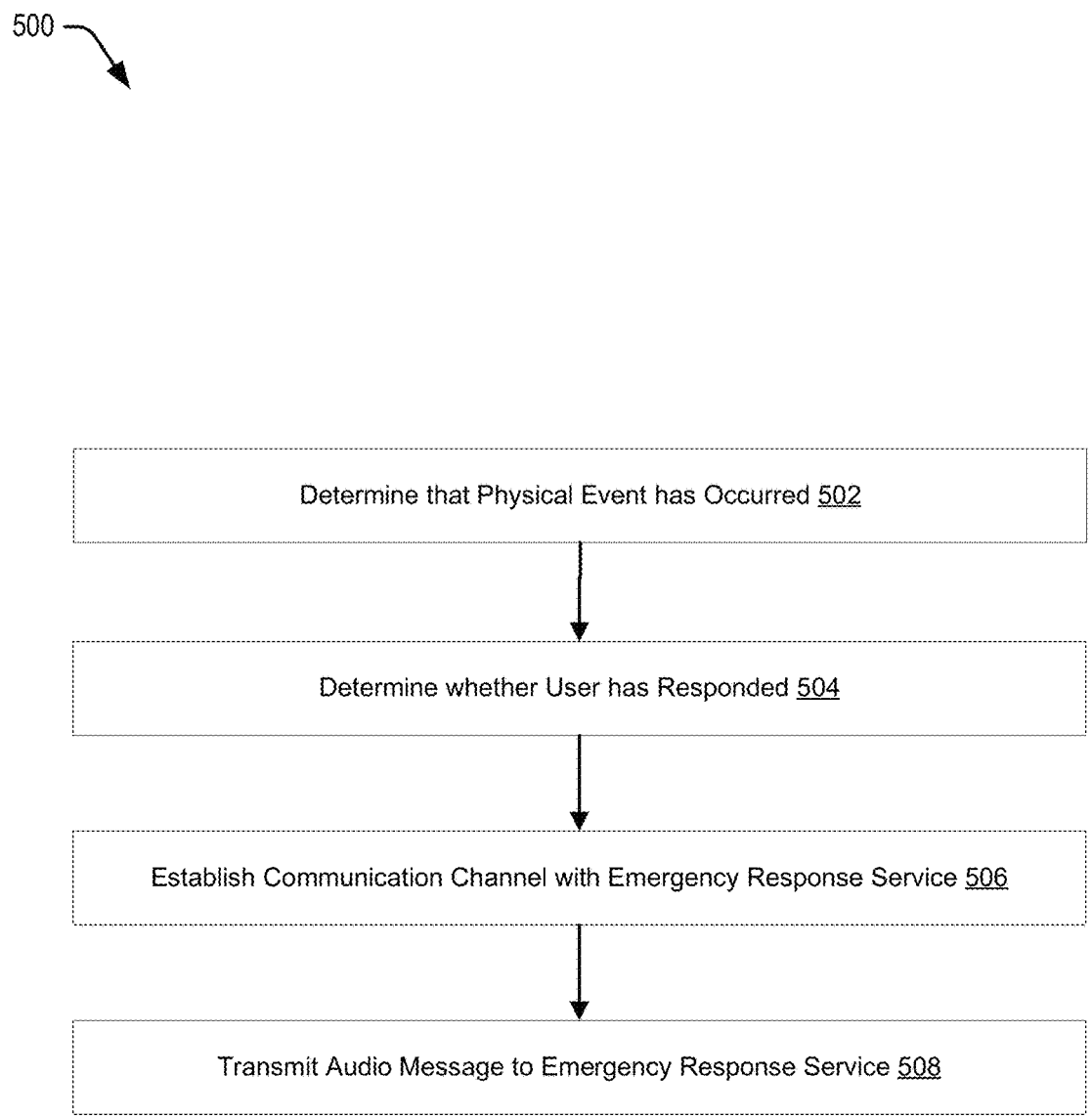
FIG. 5 is a simplified flowchart of an example method for providing audio looping techniques as described herein, according to at least one example.

FIGS. 4 and 5 are flowcharts illustrating example methods (processes) 400 and 500 for performing the techniques described herein. Some or all of the methods 400 and 500 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium is non-transitory. The methods 400 and 500 may be performed by the audio loop control engine 306 of FIG. 3.

FIG. 4 can begin at block 402, where an occurrence of a physical accident can be determined. For example, it may be determined, by a wearable device, that a user wearing the wearable device has fallen over. At block 404, it may be determined whether the user has responded to a prompt (e.g., a UI element on a screen, an audio prompt, and/or a haptic prompt). In some cases, the prompts may increase in intensity until the user responds or it is determined to proceed without a user response. At block 406, in accordance with a determination that the accident has occurred and the user has not responded within an amount of time, the device may attempt to establish a communication channel with an emergency response service. Once connected, an audio message associated with the physical accident may be transmitted at block 408. At block 410, the method 400 may end by repeating the audio message until the user responds or the call ends.

FIG. 5 can begin at block 502, where it can be determined that a physical event has occurred. At block 504, it can be determined whether the user has responded to a prompt. At block 506, in accordance with a determination that the physical event has occurred and that the user has not responded, a communication channel can be established with an emergency response service. The method 500 may end at block 508, where an audio message may be transmitted to the emergency response service.

Embodiments described herein may take the form of, be incorporated in, or operate with a suitable electronic device. One example of such a device is device 600 shown in FIG. 6 and takes the form of a wearable mechanism. As shown, the mechanism may be worn on a user's wrist and secured thereto by a band. The mechanism may have a variety of functions including, but not limited to: keeping time; monitoring a user's physiological signals and providing health-related information based on those signals; communicating (in a wired or wireless fashion) with other electronic devices, which may be different types of devices having different functionalities; providing alerts to a user, which may include audio, haptic, visual and/or other sensory output, any or all of which may be synchronized with one another; visually depicting data on a display; gather data form one or more sensors that may be used to initiate, control, or modify operations of the device; determine a location of a touch on a surface of the device and/or an amount of force exerted on the device, and use either or both as input; accepting voice input to control one or more functions; accepting tactile input to control one or more functions; and so on.

Alternative embodiments of suitable electronic devices include a mobile phone, a tablet computing device, a portable media player, and so on. Still other suitable electronic devices may include laptop/notebook computers, personal digital assistants, touch screens, input-sensitive pads or surfaces, and so on.

Figure 6:
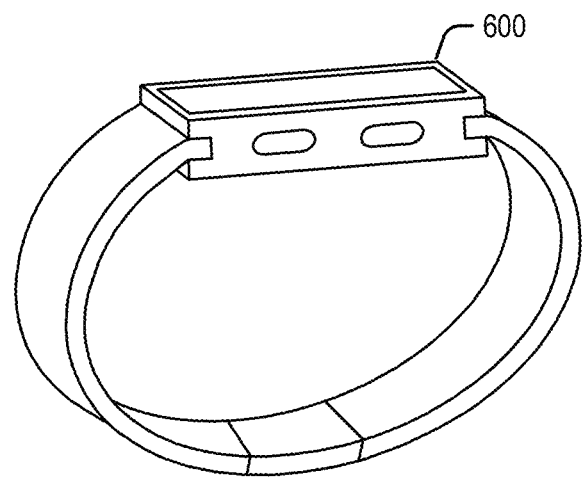
FIG. 6 is a simplified block diagram illustrating example devices for providing audio looping techniques as described herein, according to at least one example.
Figure 7:
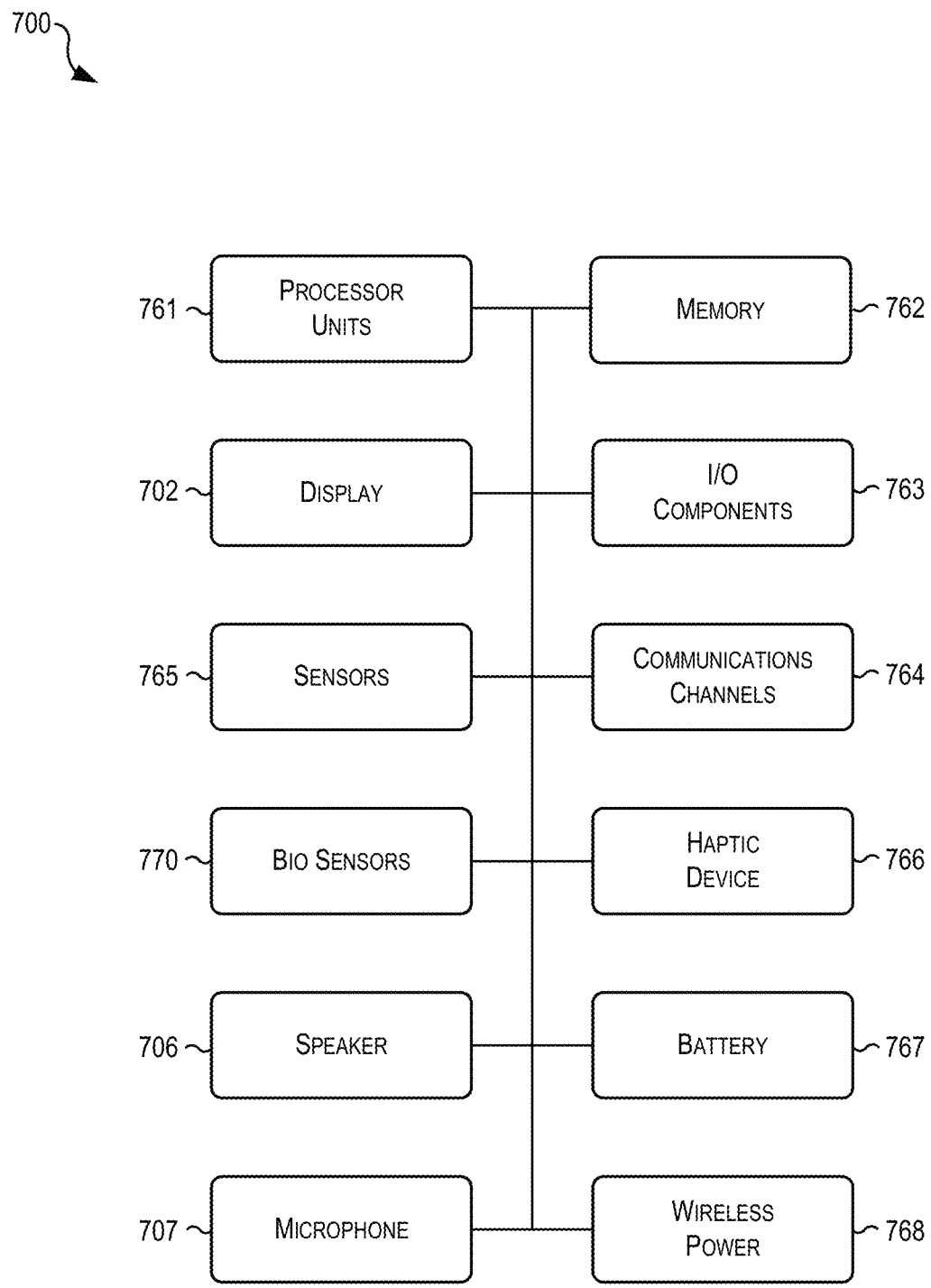
FIG. 7 is a simplified block diagram illustrating another example architecture for providing audio looping techniques as described herein, according to at least one example.

FIG. 7 depicts an example schematic diagram of wearable electronic device 700 (e.g., similar to device 600 of FIG. 6). As shown in FIG. 7, device 700 includes one or more processing units 761 that are configured to access memory 762 having instructions stored thereon. The instructions or computer programs may be configured to perform one or more of the operations or functions described with respect to device 700. For example, the instructions may be configured to control or coordinate the operation of the various components of the device. Such components include, but are not limited to, display 702, one or more input/output components 763, one or more communication channels 764, one or more sensors 765, speaker 706, microphone 707, and/or one or more haptic feedback devices 766. In some embodiments the speaker and microphone may be combined into a single unit and/or may share a common port through a housing of the device.

Processing units 761 of FIG. 7 may be implemented as any electronic device capable of processing, receiving, or transmitting data or instructions. For example, processing units 761 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

In some embodiments the electronic device may accept a variety of bands, straps, or other retention mechanisms (collectively, "bands"). These bands may be removably connected to the electronic device by a lug that is accepted in a recess or other aperture within the device and locks thereto. The lug may be part of the band or may be separable (and/or separate) from the band. Generally, the lug may lock into the electronic device's recess and thereby maintain connection between the band and device. The user may release a locking mechanism to permit the lug to slide or otherwise move out of the recess. In some embodiments, the recess may be formed in the band and the lug may be affixed or incorporated into the device.

A user may change combinations of bands and electronic devices, thereby permitting mixing and matching of the two categories. It should be appreciated that devices having other forms and/or functions may include similar recesses and may releasably mate with a lug and/or band incorporating a lug. In this fashion, an ecosystem of bands and devices may be envisioned, each of which is compatible with another. A single band may be used to connect to devices, as one further example; in such embodiments the band may include electrical interconnections that permit the two devices to transmit signals to one another and thereby interact with one another.

In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments.

Device 700 also may comprise one or more touch sensors to determine a location of a touch on the cover glass. A touch sensor may be incorporated into or on the display stack in order to determine a location of a touch. The touch sensor may be self-capacitive in certain embodiments, mutual-capacitive in others, or a combination thereof.

Similarly, device 700 may include a force sensor to determine an amount of force applied to the cover glass. The force sensor may be a capacitive sensor in some embodiments and a strain sensor in other embodiments. In either embodiment, the force sensor is generally transparent and made form transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment the force sensor may take the form of a gasket extending beneath the periphery of the display. The gasket may be segmented or unitary, depending on the embodiment.

Electronic device 700 may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic and/or visual components of the alert may be synchronized to provide an overall experience to a user. One or more components may be delayed relative to other components to create a desired synchronization between them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output but at a weak or even subliminal level, thereby priming the wearer to receive the auditory output.

Example electronic device 700 may communicate with other electronic devices either through a wired connection or wirelessly. Data may be passed between devices, permitting one device to relay information to another; control another; employ another's sensors, outputs, and/or inputs; and so on.

Figure 8:
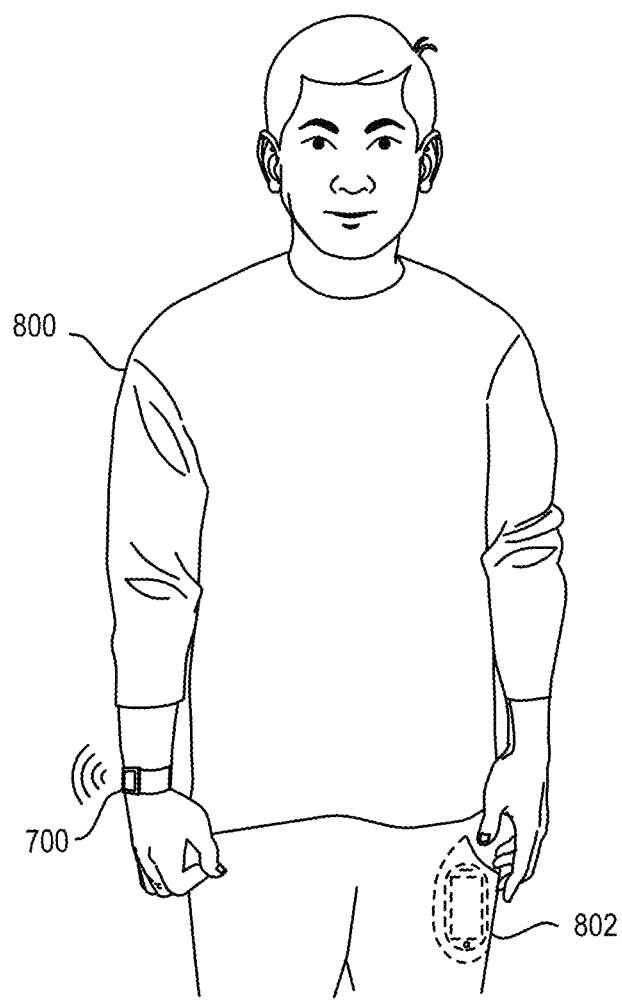
FIG. 8 is a simplified block diagram illustrating additional example devices for providing audio looping techniques as described herein, according to at least one example.

FIG. 8 depicts user 800 wearing a sample wearable electronic device 700 with a second (e.g., portable) electronic device 802 in his pocket. Data may be wirelessly transmitted between the electronic devices 700, 802, thereby permitting the user 800 to receive, view, and interact with data from the second device 802 by means of the first electronic device 700. Thus, the user 800 may have access to part or all of the second device's functionality through the first electronic device 700 without actually needing to interact directly with the second device 802.

Further, the electronic devices 700, 802 may cooperate not only to share data but to share functionality as well. For example, one of the two devices may incorporate a sensor, application, or function that the other lacks. The electronic device lacking such capabilities may request them from the other device, which may share wirelessly with the requesting device. Thus, multiple devices may operate together to provide expanded functions, software, access and the like between the two and ultimately to a user. As one non-limiting example, the electronic device 700 may be unable to place or receive telephone calls while the second device 802 may be able to do so. A user may nonetheless make and/or receive calls through the first device 700, which may employ the second device 802 to actually place or accept a call.

As another non-limiting example, an electronic device 700 may wirelessly communicate with a sales terminal nearby, thus permitting a user to quickly and efficiently conduct a transaction such as selling, buying, or returning a good. The electronic device may use near field communications technology to perform these and other functions.

As mentioned above, a band may be connected to two electronic devices and may serve as a wired communication path between the two. As another example, the devices may communicate wirelessly, thereby permitting one device to relay information from a second to a user. This latter example may be particularly useful when the second is inaccessible.

Certain embodiments may incorporate one or more biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. Also include blood pressure, ultraviolet exposure, etc. Depending on the sensors incorporated into or associated with the electronic device, a variety of user characteristics may be measured and/or estimated, thereby permitting different health information to be provided to a user. In some examples, the sensed biometric information may be used by the alert manager, in part, for managing the electronic content and/or the incoming alerts.

Certain embodiments may be wirelessly charged. For example, an inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes.

In certain embodiments, the device may include a rotary input, which may take the form of a crown with a stem. The crown and stem may be rotated to provide the rotary input. Rotation of the stem and/or crown may be sensed optically, electrically, magnetically, or mechanically. Further, in some embodiments the crown and stem may also move laterally, thereby providing a second type of input to the device.

The electronic device may likewise include one or more buttons. The button(s) may be depressed to provide yet another input to the device. In various embodiments, the button may be a dome switch, rocker switch, electrical contact, magnetic switch, and so on. In some embodiments the button may be waterproof or otherwise sealed against the environment.

Various embodiments may include or otherwise incorporate one or more motion sensors. A motion sensor may detect motion of the device and provide, modify, cease, or otherwise affect a state, output, or input of the device or associated applications based on the motion. As non-limiting examples, a motion may be used to silence the device or acknowledge an alert generated by the device. Sample motion sensors include accelerometers, gyroscopic sensors, magnetometers, GPS sensors, distance sensors, and so on. Some embodiments may use a GPS sensor to facilitate or enable location and/or navigation assistance.

As shown in FIG. 7, device 700 may also include one or more acoustic elements, including speaker 706 and/or microphone 707. Speaker 706 may include drive electronics or circuitry and may be configured to produce an audible sound or acoustic signal in response to a command or input. Similarly, microphone 707 may also include drive electronics or circuitry and is configured to receive an audible sound or acoustic signal in response to a command or input. Speaker 706 and microphone 707 may be acoustically coupled to port or opening in the case that allows acoustic energy to pass, but may prevent the ingress of liquid and other debris.

Certain embodiments may incorporate an ambient light sensor. The ambient light sensor may permit the device to sense a brightness of its environment and adjust certain operational parameters accordingly. For example, the electronic device may modify a brightness of a display in response to the sensed ambient light. As another example, the electronic device may turn the display off if little or no light is sensed for a period of time.

These and other functions, operations, and abilities of the electronic device will be apparent upon reading the specification in its entirety.

In certain embodiments, an electronic device may include one or more haptic modules for providing haptic feedback to the user. The embodiments described herein may relate to or take the form of one or more haptic actuators suitable to provide perceivable haptic feedback. Such actuators may include an electromagnetic coil, a permanent magnet or other magnetic field source. The magnetic field may induce motion in a mass of the haptic actuator by exerting a Lorentz force on the mass when the coil is energized. A direction of current through the coil determines the direction of motion of the mass, while the strength of the magnetic field determines the velocity of the mass and thus the magnitude of the haptic output.

In general, haptic actuators implemented in some embodiments may be configured to maximize or enhance resultant mechanical energy, given a very compact form factor of the electronic device.

In one embodiment, the haptic actuator may have a mass at least partially disposed within the coil when the mass is in a rest state. This mass may include two magnets of opposing polarities implemented as a magnet array affixed within a frame; the frame may provide extra weight to the mass and thus a stronger haptic output may be generated. A shaft may extend through the mass such that the mass may freely slide on the shaft.

The magnet array may generate a radial magnetic field that interacts with the magnetic field of the coil when the coil is energized by a current. The Lorentz force resulting from the interaction of the magnetic fields causes the mass to move along a shaft in a first direction. Reversing current flow through the coil reverses the Lorentz force. As a result, the magnetic field or force on the central magnet array is also reversed and the mass may move in a second direction. Thus, mass may move in both directions along the shaft, depending on the direction of current flow through the coil. Passing an alternating current through the coil may cause the central magnet array to move back and forth along a shaft.

In order to prevent the central magnet array from being attracted to the shaft, which could increase friction between the two and thereby increase the force necessary to move the central magnet array and frame, the shaft may be formed from a non-ferritic material such as tungsten, titanium, stainless steel, or the like.

The actuator also may have structures that provide restoring force to the mass. For example, a spring may be located at either end of the shaft. As the mass impacts the spring, the spring compresses and stores kinetic energy. This kinetic energy may be released to return the mass along the shaft, thereby sending it to or near its initial starting position. The kinetic energy in the spring(s) may cooperate with the coil to move the magnet in such a fashion.

Figure 9:
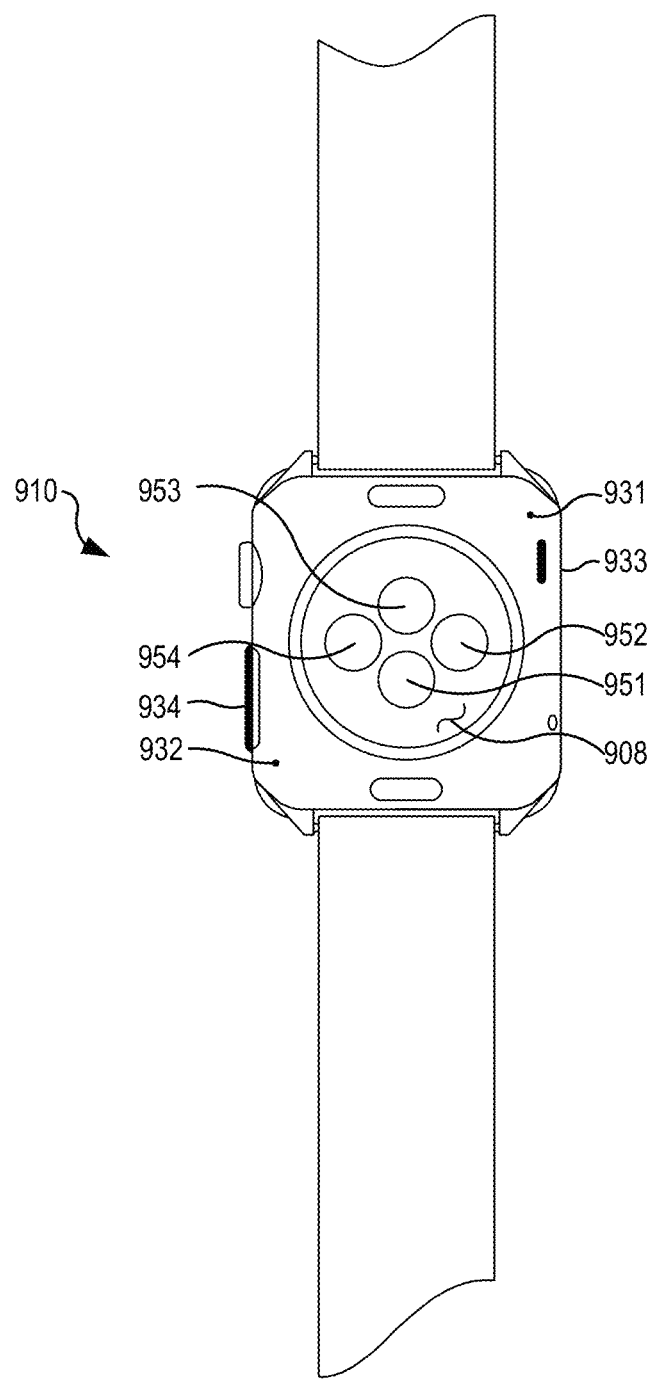
FIG. 9 is a simplified block diagram illustrating additional example devices for providing audio looping techniques as described herein, according to at least one example.

FIG. 9 depicts an example electronic device 900 having one or more biometric sensors. The electronic device 900 is an example of the wearable user device 102. As shown in FIG. 9, an array of light sources and a photodetector 951-1254 may be disposed on the rear surface of the device 900. In one example, the light sources 951-1253 are formed from light emitting diode (LED) elements that are configured to emit light into a portion of the wearer's body (e.g., wrist). The photodetector 954 is shared between the multiple light sources 951-1253 and is configured to receive light reflected from the body. The photodetector may be formed from a photodiode material that is configured to produce a signal based at least in part on the received light. In one implementation, the signal produced by the photodetector 954 is used to compute a health metric associated with the wearer. In some cases, the light sources 951-1253 and the photodetector 954 form a photoplethysmography (PPG) sensor. The first light source 951 may include, for example, a green LED, which may be adapted for detecting blood perfusion in the body of the wearer. The second light source 952 may include, for example, an infrared LED, which may be adapted to detect changes in water content or other properties of the body. The third 953 light source may be a similar type or different types of LED element, depending on the sensing configuration. The optical (e.g., PPG) sensor or sensors may be used to compute various health metrics, including, without limitation, a heart rate, a respiration rate, blood oxygenation level, a blood volume estimate, blood pressure, or a combination thereof. One or more of the light sources 951-1253 and the photodetector 954 may also be used for optical data transfer with a base or other device. While FIG. 9 depicts one example, the number of light sources and/or photodetectors may vary in different examples. For example, another example may use more than one photodetector. Another example may also use fewer or more light sources than are depicted in the example of FIG. 9.

Also as shown in FIG. 9, the device 900 includes multiple electrodes 931, 932, 933, 934 that are located on or near external surfaces of the device 900. In the present example, the device 900 includes a first electrode 931 and a second electrode 932 that are located on or proximate to a rear-facing surface of the device body 910. In this example, the first electrode 931 and the second electrode 932 are configured to make electrical contact with the skin of the user wearing the device 900. In some cases, the first 931 and second 932 electrodes are used to take an electrical measurement or receive an electrical signal from the body of the user. As also shown in FIG. 9, the device 900 may include a third electrode 933 and a fourth electrode 934 that are located on or proximate to a perimeter of the case of the device body 910. In the present example, the third 933 and fourth 934 electrodes are configured to be contacted by one or more fingers of the user who is wearing or interacting with the device 900. In some cases, the third 933 and fourth 934 electrodes are also used to take an electrical measurement or receive an electrical signal from the body of the user. In some cases, the first 931, second 932, third 933, and fourth 934 electrodes are all used to take a measurement or series of measurements that can be used to compute another health metric of the user's body. Health metrics that may be computed using the electrodes include, without limitation, heart functions (ECG, EKG), water content, body-fat ratios, galvanic skin resistance, and combinations thereof.

In the configuration depicted in FIG. 9, the electronic device 900 includes one or more apertures in the case 910. A light source 951-1254 may be disposed in each aperture. In one example, each light source 951-1253 is implemented as a light-emitting diode (LED). In the present example, the four apertures, three light sources 951-1253, and a single detector 954 are used to form one or more sensors. Other examples can include any number of light sources. For example, two light sources can be used in some examples.

The light sources may operate at the same light wavelength range, or the light sources can operate at different light wavelength ranges. As one example, with two light sources one light source may transmit light in the visible wavelength range while the other light source can emit light in the infrared wavelength range. With four light sources, two light sources may transmit light in the visible wavelength range while the other two light sources can emit light in the infrared wavelength range. For example, in one example, at least one light source can emit light in the wavelength range associated with the color green while another light source transmits light in the infrared wavelength range. When a physiological parameter of the user is to be determined, the light sources emit light toward the user's skin and the optical sensor senses an amount of reflected light. In some cases, a modulation pattern or sequence may be used to turn the light sources on and off and sample or sense the reflected light.

Although a linear actuator has been described herein, it should be appreciated that other types of actuators may be used in different embodiments. For example, some embodiments may employ a rotary actuator, a piezoelectric actuator, or any other suitable linear or non-linear actuator. Likewise, certain embodiments may employ multiple actuators working in concert.

Illustrative methods, computer-readable media, and systems for providing audio looping techniques are described above. Some or all of these systems and methods may, but need not, be implemented at least partially by architectures such as those shown at least in FIGS. 1-9 above. While many of the embodiments are described above with reference to wearable devices and cellular telephone calls, the various techniques can be implemented by other types of devices and other network/connection technologies. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

As described above, one aspect of the present technology is the gathering and use of data available from specific and legitimate sources to improve the ability of user devices to assist in emergency situations by making emergency calls on behalf of the user and providing valuable information to the recipients. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data (e.g., users health information, physical location, etc.) can be used to help emergency service responders and technicians to identify when a user needs medical attention and/or where the user is located. For example, information about previous health conditions of the user can help emergency services identify what type of medical attention is needed, and what type of technicians to send to the location of the user.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of personal health information, the present technology can be configured to allow users to select to "opt in" or "opt out" of participation in the collection and/or delivery of personal information data during registration for services or anytime thereafter. In another example, users can select not to provide their personal health information to service providers. In yet another example, users can select to limit the amount of health information that is provided, thus enabling some, but not all, of the health information to be shared. Additionally, users may choose to allow location information, but not any health information, to be shared. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A mobile device, comprising:
a speaker;
a display screen; and
one or more processors in communication with one or more memories and the speaker, the one or more processors configured to execute computer-executable instructions stored on the one or more memories to at least:

determine whether a user has responded to a first user interface prompt displayed on the display screen in response to detection of a physical event associated with the user;
in accordance with a determination that the user has not responded to the first user interface prompt prior to expiration of a first time period:
begin a countdown timer to run for a second time period;
during the second time period, output, via the speaker, an audio alert;
during the second time period, output a haptic alert;
in accordance with a determination that the user has not responded to a second user interface prompt displayed on the display screen prior to expiration of the second time period, transmit a communication channel request to an emergency response service; and
after a communication channel has been established with the emergency response service, output, via the speaker, two or more loops of an audio message associated with the detection of the physical event associated with the user, wherein outputting the two or more loops of the audio message comprises outputting a first loop of the audio message at a first volume level and a second loop of the audio message at a second volume level.

2. The mobile device of claim 1, wherein outputting the audio alert comprises:
outputting the audio alert at a first intensity level at a first time; and
outputting the audio alert at a second intensity level at a second time, the second intensity level being greater than the first intensity level.

3. The mobile device of claim 1, wherein outputting the audio alert comprises ramping up the audio alert during the second time period.

4. The mobile device of claim 1, wherein outputting the audio alert and outputting the haptic alert comprise comprises outputting the audio alert and outputting the haptic alert at an increasing level of intensity beginning at a beginning of the second time period and ending at a conclusion of the second time period.

5. The mobile device of claim 1, wherein the audio alert indicates that the mobile device will transmit the communication channel request to the emergency response service if the user does not respond to the second user interface prompt.

6. The mobile device of claim 1, wherein the one or more memories store further computer-executable instructions, and the one or more processors are configured to execute the further computer-executable instructions stored on the one or more memories to at least, in accordance with a determination that the user has responded to the second user interface prompt prior to expiration of the second time period, refrain from transmitting the communication channel request to the emergency response service.

7. The mobile device of claim 1, wherein the first user interface prompt and the second user interface prompt are of the same type of prompt.

8. The mobile device of claim 1, wherein the first user interface prompt comprises a first user interface element that includes a first prompt, and wherein the second user interface prompt comprises a second user interface element comprising a second prompt.

9. The mobile device of claim 1, wherein outputting the two or more loops of the audio message comprises repeating the two or more loops of the audio message at least until receiving a user input from the user or termination of the communication channel.

10. A computer-implemented method, comprising:
determining whether a user has responded to a first user interface prompt displayed on a display screen in response to detection of a physical event associated with the user;
in accordance with a determination that the user has not responded to the first user interface prompt after expiration of a first time period:
beginning a countdown timer to run for a second time period;
during the second time period, outputting, via a speaker, an audio alert;
during the second time period, outputting a haptic alert; and
in accordance with a determination that the user has not responded to a second user interface prompt displayed on the display screen prior to expiration of the second time period, transmitting a communication channel request to an emergency response service; and
after a communication channel has been established with the emergency response service, outputting, via the speaker, two or more loops of an audio message associated with the detection of the physical event associated with the user, wherein outputting the two or more loops of the audio message comprises varying a volume level between a first loop of the audio message and a second loop of the audio message.

11. The computer-implemented method of claim 10, wherein outputting the audio alert comprises:
outputting the audio alert at a first intensity level at a first time; and
outputting the audio alert at a second intensity level at a second time, the second intensity level being greater than the first intensity level.

12. The computer-implemented method of claim 10, wherein outputting the audio alert and outputting the haptic alert comprise outputting the audio alert and outputting the haptic alert at an increasing level of intensity beginning at a beginning of the second time period and ending at a conclusion of the second time period.

13. The computer-implemented method of claim 10, wherein the audio alert indicates that transmission of the communication channel request to the emergency response service will occur if the user does not respond to the second user interface prompt.

14. The computer-implemented method of claim 10, wherein the second user interface prompt comprises a cancelation of the communication channel request to the emergency response service.

15. The computer-implemented method of claim 10, further comprising, in accordance with a determination that the user has responded to the second user interface prompt prior to expiration of the second time period, refraining from transmitting the communication channel request to the emergency response service.

16. The computer-implemented method of claim 10, wherein outputting the two or more loops of the audio message comprises outputting the two or more loops of the audio message without receiving a user input relating to the volume level of the two or more loops.

17. A computer-readable storage medium storing computer-executable instructions that, when executed by one or more processors of a mobile device, cause the mobile device to perform operations comprising:
determining whether a user has responded to a first user interface prompt displayed on a display screen of the mobile device in response to detection of a physical event associated with the user;
in accordance with a determination that the user has not responded to the first user interface prior to expiration of a first time period:
beginning a countdown timer to run for a second time period;
during the second time period, outputting, via a speaker, an audio alert;
during the second time period, outputting a haptic alert; and
in accordance with a determination that the user has not responded to a second user interface prompt displayed on the display screen of the mobile device prior to expiration of the second time period, transmitting a communication channel request to an emergency response service; and
after a communication channel has been established with the emergency response service, outputting, via the speaker, two or more loops of an audio message associated with the detection of the physical event associated with the user, wherein outputting the two or more loops of the audio message comprises outputting a first loop of the audio message at a first volume level and a second loop of the audio message at a second volume level.

* * * * *

UNITED STATES PATENT AND TRADEMARK OFFICE
CERTIFICATE OF CORRECTION

| | |
|---|---|
| PATENT NO. | : 11,605,274 B2 |
| APPLICATION NO. | : 17/131466 |
| DATED | : March 14, 2023 |
| INVENTOR(S) | : Albert Riley Howard et al. |

It is certified that error appears in the above-identified patent and that said Letters Patent is hereby corrected as shown below:

In the Claims

Claim 4, Column 22, Lines 39-40: delete "comprise comprises" and insert --comprises--

Signed and Sealed this
Eleventh Day of April, 2023

*Katherine Kelly Vidal*

Katherine Kelly Vidal
*Director of the United States Patent and Trademark Office*